(12) United States Patent
Findlay et al.

(10) Patent No.: US 7,660,812 B2
(45) Date of Patent: Feb. 9, 2010

(54) TRACKING PHYSICAL INVENTORY OF DATA STORAGE MEDIA

(75) Inventors: Brian D. Findlay, Woodbury, MN (US); Purushotham G. Lala Balaji, St. Paul, MN (US)

(73) Assignee: Imation Corp., Oakdale, MN (US)

( * ) Notice: Subject to any disclaimer, the term of this patent is extended or adjusted under 35 U.S.C. 154(b) by 434 days.

(21) Appl. No.: 11/219,044

(22) Filed: Sep. 2, 2005

(65) Prior Publication Data
US 2007/0055686 A1 Mar. 8, 2007

(51) Int. Cl.
*G06F 7/00* (2006.01)
(52) U.S. Cl. .......................... 707/102; 705/1
(58) Field of Classification Search ................ 707/102
See application file for complete search history.

(56) References Cited

U.S. PATENT DOCUMENTS

| | | | | |
|---|---|---|---|---|
| 4,945,428 | A * | 7/1990 | Waldo | 360/92.1 |
| 5,253,821 | A | 10/1993 | Johnson | |
| 6,201,474 | B1 | 3/2001 | Brady et al. | |
| 6,226,688 | B1 | 5/2001 | Frary | |
| 6,336,173 | B1 * | 1/2002 | Day et al. | 711/161 |
| 2001/0000019 | A1 * | 3/2001 | Bowers et al. | 340/572.1 |
| 2002/0180588 | A1 * | 12/2002 | Erickson et al. | 340/10.2 |
| 2002/0191322 | A1 | 12/2002 | Jerman | |
| 2005/0021524 | A1 * | 1/2005 | Oliver | 707/100 |
| 2005/0149413 | A1 * | 7/2005 | Amling et al. | 705/28 |
| 2006/0169773 | A1 * | 8/2006 | Lyons et al. | 235/385 |

FOREIGN PATENT DOCUMENTS

| | | |
|---|---|---|
| EP | 1 225 577 | 11/2004 |
| JP | 3605106 | 10/2004 |
| WO | WO 01/06507 | 1/2001 |

* cited by examiner

*Primary Examiner*—Pierre M Vital
*Assistant Examiner*—Truong V Vo
(74) *Attorney, Agent, or Firm*—Shumaker & Sieffert, P.A.

(57) ABSTRACT

The invention is directed to a business technique for supplying customers with a set of data storage media and a database for tracking physical inventory of the set of data storage media. The media tracking database is generated by the media supplier from a proprietary manufacturer database that stores a unique identification number, volume/serial (VolSer) number, purchase order data, and other manufacturing data. Accordingly, the media tracking database includes a subset of the plurality of fields that form the manufacturer database. Specifically, the media tracking database is populated with the manufacturer assigned unique identification umber, VolSer number, and purchase order data for each of the data storage media prior to selling the database to the customer. When the customer receives the media tracking database, it can be relationally linked to tape management, library management, and off-site storage software thereby providing complete cradle-to-grave traceability of the set of data storage media.

13 Claims, 6 Drawing Sheets

TRACKING PHYSICAL INVENTORY OF DATA STORAGE MEDIA

TECHNICAL FIELD

The invention relates to data storage and, more particularly, to a system for tracking physical inventory of data storage media.

BACKGROUND

Data storage media are commonly used for storage and retrieval of data, and come in many forms, such as magnetic tape, magnetic disks, optical tape, optical disks, holographic disks, cards or tape, and the like. Magnetic tape media remains an economical medium for storing large amounts of data. Accordingly, magnetic tape cartridges, or large spools of magnetic tape are often used to back up large amounts of data for large computing centers.

Organizations often utilize a library system to store and transfer data to and from hundreds or thousands of tape cartridges. In general, a library system comprises a number of tape cartridges, one or more tape backup drives, a robotic mechanism for changing tape cartridges, magazines or slots to hold the tape cartridges, and software for controlling access to and tracking physical inventory of tape cartridges. The software maintains a database for tracking physical inventory of tape cartridges in the library system. In particular, the software maintains the database for tracking tape cartridges which store data to backup and restore applications so that applications can be recovered if a system failure or disaster occurs. However, tape cartridges which store data that is unlikely to be accessed often are sometimes stored in off-site storage facilities and may not be tracked within the database.

The end user normally receives tape cartridges and the volume/serial (VolSer) number for each cartridge from a manufacturer or distributor. Typically, the manufacturer or distributor provides a label and initialization (L&I) service for applying a barcoded volume/serial (VolSer) number on the tape cartridges. The VolSer number is unique to the library system and may be used to track physical inventory of the tape cartridges within the library system. However, the VolSer number is only unique within the library system, i.e., the VolSer number may not be unique at off-site storage facilities.

Conventional tape cartridge architectures, such as Linear Tape Open (LTO) and Titanium, utilize a high frequency, e.g., 13 MHz, radio frequency identification (RFID) tag for quick communication with the drive to track usage data, such as the last four drive mounts, recent performance data, and the amount of information stored on the cartridge. For example, each time a tape cartridge is loaded or unloaded from a drive, the library system may read the RFID tag and store the read data in the database. The RFID tag may be affixed to or within the housing of the tape cartridges.

Storage industry trends are creating requirements for physical, encryption, and disaster recovery protection against threats to stored data, such as government, financial, and medical data. For example, the Sarbanes-Oxley Act of 2002 requires that all public corporations that trade their stock in the United States must store or retain all transactions that go into financial statements for a period of time, e.g., 5-10 years or longer. Failure to comply with Sarbanes-Oxley can result in significant financial penalties and criminal charges. Consequently, a large amount of new data will be generated to comply with Sarbanes-Oxley, but this data may only be needed in the case of an audit. Thus, there is a growing importance for tracking physical inventory of tape cartridges, and other data storage media, within a library system and off-site storage facilities.

SUMMARY

In general, the invention is directed to a technique for supplying end users or customers with a set of data storage media, e.g. tape cartridges, and a database for tracking physical inventory of the set of data storage media. In particular, a manufacturer or media supplier supplies the end user with a non-proprietary media tracking database that includes a subset of the fields that form a proprietary manufacturer database. For example, a particular field of the media tracking database is populated with the unique identifier field from the manufacturer database that stores the manufacturer assigned unique identification number for each of the data storage media. The media tracking database may also be populated with the volume/serial (VolSer) numbers and purchase order information for each of the data storage media prior to the end user receiving the database and data storage media. The unique identification number may be relationally linked to the VolSer number and purchase order information for each of the data storage media. Accordingly, the unique identification number may be used as the primary key to the media tracking database. Additionally, the media tracking database can be loaded into or relationally linked with the software of the physical inventory system, i.e., tape management software, library management software, and off-site storage software. Consequently, the media tracking database can be transferred from the media supplier to a distributor, library system data center, and off-site storage facility. In this manner, the invention supplies end users with a populated media tracking database that relationally links the unique identifier, VolSer number, and purchase order information for a set of data storage media in an end user physical inventory system.

Each data storage media manufactured by a media supplier typically has a unique identifier or marker that is associated with a unique identification number. The unique identifier may be a 9940 linear barcode on the housing of the data storage media, a 2D snowflake barcode on the housing, a RFID tag on or within the housing, or other unique identifier. In any case, the media supplier maintains a proprietary manufacturer database for complete traceability of data storage media by scanning the unique identifier on the data storage media. For example, the manufacturer database may comprise fields for storing the unique identification number, manufacturing date, process step and the time the media went through the process step, purchase order information, VolSer number, and other manufacturing information. In particular, the unique identification number is used as the primary key for the manufacturer database and is relationally linked to purchase order information and the VolSer number. Thus, the manufacturer database allows the media supplier to track manufacturing information for each data storage media throughout the life of the media within the media supplier, i.e., from fabrication to delivery to the end user.

The media supplier, however, typically provides a set of data storage media to the end user only with VolSer numbers. Thus, the media is only identified with a VolSer number and the end user database is not populated with any information or relationally linked to manufacturing or purchase order information prior to loading the media into the library system. Populating the database with the VolSer number, purchase order information, and other information adds cost to the purchase of media and may be labor intensive when large numbers of media must be scanned manually. In any case, the VolSer number is used as the primary key for the end user database after the database has been populated. However, the VolSer number is unique only within the library system, i.e., the VolSer number may not be unique at off-site storage facilities.

Further, a large amount of new data will be generated to comply with industry trends, such as the Sarbanes-Oxley Act of 2002, that require data to be stored for a period of time, e.g., 5-10 years or longer. As a result, there is a growing importance for cradle-to-grave traceability of media within a physical inventory system, i.e., a library system and off-site storage facilities.

As described herein, the end user is supplied with a set of data storage media and a populated database for tracking physical inventory of the data storage media. In general, the media tracking database includes a subset of the fields that from the manufacturer database. More specifically, the subset of fields is populated with the unique identification number, VolSer number, and purchase order information for each of the data storage media prior to the end user receiving the media tracking database. In addition, the unique identification number is relationally linked to the VolSer number and the purchase order information thereby allowing the unique identification number to be used as the primary key to the media tracking database. Further, the media tracking database can be loaded into or relationally linked with the tape management software, library management software, and off-site storage software of a physical inventory system. Consequently, the media tracking database provides complete cradle-to-grave or life cycle traceability within a physical inventory system and can be accessed and/or maintained by tape management software, library management software, and off-site storage software.

Some standard conventional tape cartridges include tape for storing electronic information, housing containing the tape, and a non-contact memory chip, such as an electronically erasable programmable read only memory (EEPROM) chip that uses a radio frequency interface to communicate with a drive, on or within the housing of the cartridge. The EEPROM chip stores usage information and is read by a drive. In contrast, the invention provides an international organization for standardization (ISO) 18000 or electronic product code (EPC) readable RFID tag on or within the housing of a tape cartridge that stores a unique identification number and physical inventory information, such as a VolSer number, purchase order information, usage information, and GPS information. More specifically, the RFID tag may use the ISO 18000 standard as an air interface protocol to communicate with the drive thereby allowing the RFID tag to store an EPC and provide functionality desired by AutoID Centers and off-site storage facilities. As an example, the ISO 18000 or EPC readable RFID tag may comprise a factory applied RFID tag on or within the housing of the cartridge or an RFID tag integrated into an L&I barcode label on the housing. Thus, a library system or data center and off-site storage facilities can use standard ISO 18000 and EPC standardized reading and inventory software for tracking physical inventory of tape cartridges. As a result, a number of tape cartridges, e.g., five or more cartridges, can be scanned or monitored within an expanded field rather than manually scanning L&I barcode labels.

In one embodiment, the invention is directed to generating a non-proprietary media tracking database for tracking physical inventory of a set of data storage media from a proprietary manufacturer database comprising a plurality of fields that store manufacturing information for the set of data storage media, wherein one field of the plurality of fields stores a manufacturer assigned unique identification number for each of the data storage media and wherein the media tracking database comprises a subset of the plurality of fields, populating a field of the subset of fields with the unique identifier field from the manufacturer database, and selling the set of data storage media and the media tracking database to an end user.

In another embodiment, the invention is directed to a system for tracking physical inventory of a set of data storage cartridges comprising a set of data storage media wherein each data storage media includes a unique identifier that stores a manufacturer assigned unique identification number, a proprietary manufacturer database comprising a plurality of fields that store manufacturing data for a set of data storage media, wherein one field of the plurality of fields stores the unique identification number for each of the data storage media, and a non-proprietary media tracking database comprising a subset of fields of the plurality of fields for tracking physical inventory of the set of data storage media, wherein one field of the subset of fields is populated with the unique identification number field from the manufacturer database and the set of data storage media is sold to an end user with the media tracking database.

In yet another embodiment, the invention is directed to a data storage cartridge comprising a recording medium, a housing containing the recording medium, and an ISO 18000 or EPC readable RFID tag affixed to or within the housing that stores a manufacturer assigned unique identification number and physical inventory information.

The invention may be capable of providing one or more advantages. For example, unlike an end user database that is not populated prior to scanning or loading a set of data storage media into a library system, the invention provides a media tracking database comprising a subset of the fields from a manufacturer database that are populated with the unique identification number, VolSer number, and purchase order information for each of the data storage media. In addition, the media tracking database uses the unique identification number as the primary key for tracking physical inventory information within the database. Moreover, the unique identification number assigned to each data storage media by the media supplier is unique and is relationally linked to the VolSer number and purchase order information. Thus, media tracking database provides complete cradle-to-grave traceability of the data storage media and can be accessed or maintained by tape management software, library management software, and off-site storage software without potential issues caused by identifying data storage media with a VolSer number that is only unique within a library system.

Further, the invention provides a tape cartridge with an ISO 1800 or EPC readable RFID tag on or within the housing that stores the unique identification number and physical inventory information, such as a VolSer number, purchase order information, usage information, and GPS information. Thus, a library system and off-site storage facilities can use standard ISO 18000 or EPC standardized reading and inventory software for tracking physical inventory of tape cartridges. Consequently, rather than manually scanning or loading the tape cartridges individually, five or more tape cartridges may be scanned or monitored within an expanded field.

The details of one or more embodiments of the invention are set forth in the accompanying drawings and the descrip-

DETAILED DESCRIPTION

Figure 1:
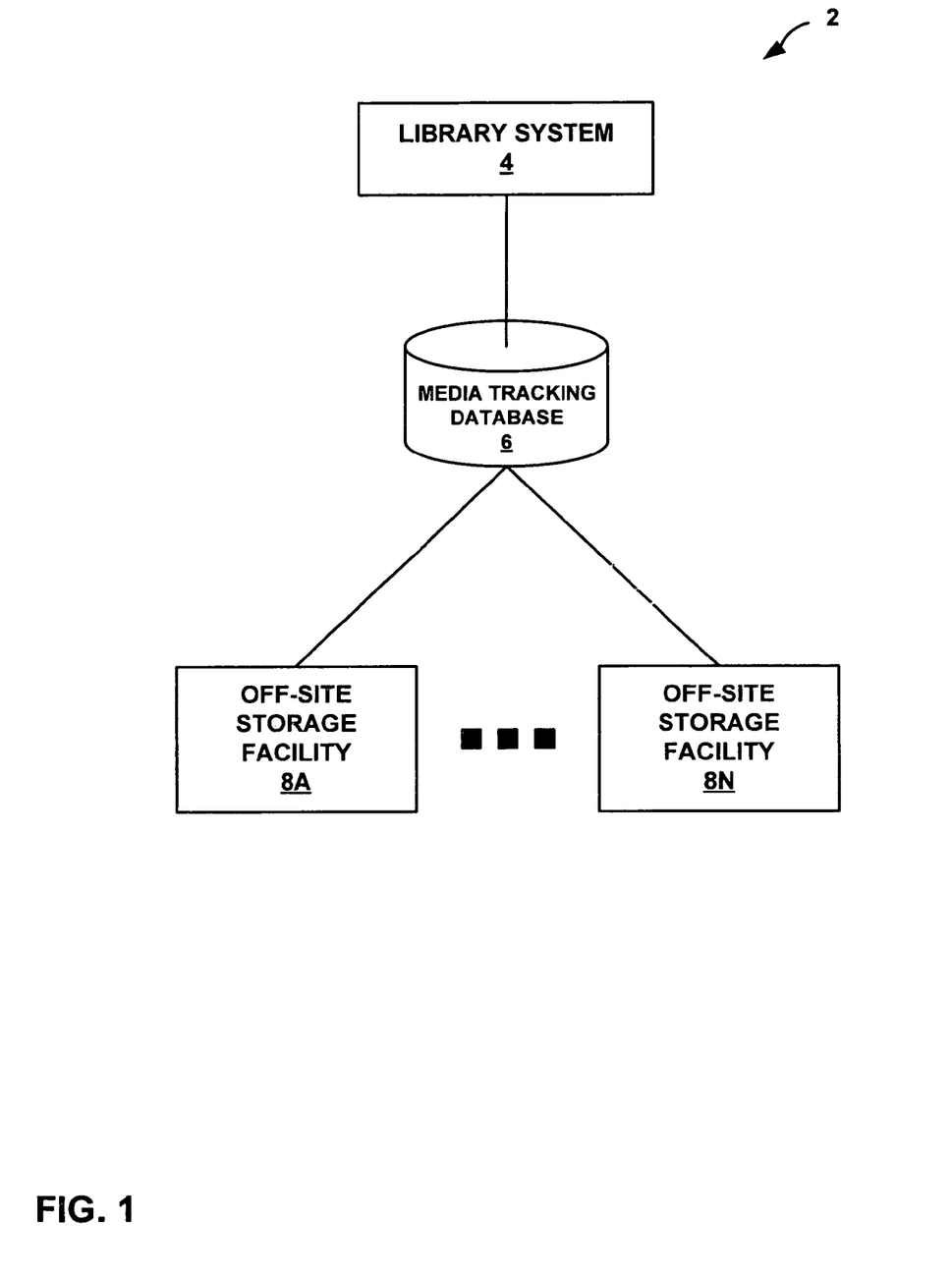
FIG. 1 is a block diagram illustrating a system for tracking physical inventory of a set of data storage media in accordance with an embodiment of the invention.

FIG. 1 is a block diagram illustrating a system 2 for tracking physical inventory of a set of data storage media (not shown) in accordance with an embodiment of the invention. In general, a manufacturer or media supplier (not shown) supplies an end user (not shown) with a set of data storage media (not shown), e.g., a set of tape cartridges, and a media tracking database 6 for tracking physical inventory of the set of data storage media. More specifically, media tracking database 6 is generated from a proprietary manufacturer database that stores manufacturing information as well as the unique identification number, volume/serial (VolSer) number, and purchase order information for each data storage medium. Accordingly, media tracking database 6 is populated with selected information from the manufacturer database, such as the unique identification number, VolSer number, and purchase order information for each of the data storage media, before supplying media tracking database 6 to the end user. When the end user receives media tracking database 6, database 6 is relationally linked or loaded into library system 4 and off-site storage facilities 8A-8N (collectively referred to as "off-site storage facilities 8") thereby allowing library system 4 and off-site storage facilities 8 to access and/or maintain media tracking database 6. Consequently, media tracking database 6 provides complete cradle-to-grave or life cycle traceability of a set of data storage media within physical inventory system 2.

Storage industry trends are creating requirements for physical, encryption, and disaster recovery protection against threats to stored data, such as government, financial, and medical data. As an example, the Sarbanes-Oxley Act of 2002 requires that all public corporations that trade their stock in the United States must store or retain all transactions that go into financial statements for a period of time, e.g., 5-10 years or longer. Failure to comply with the Sarbanes-Oxley Act results in significant financial penalties and criminal charges. Consequently, a large amount of new data will be generated to comply with the Sarbanes-Oxley Act, but this data may only be needed in the case of an audit. Thus, there is a growing importance for tracking physical inventory of data storage media and, more particularly, tape cartridges, within a library system and off-site storage facilities.

An end user such as a financial, medical, government, or other organization may utilize physical inventory system 2 to track physical inventory of a set of data storage media that stores a large amount of data. In particular, library system 4 may be used to store and transfer data to and from hundreds or thousands of data storage media and maintain media tracking database 6 to track physical inventory of the media. For example, library system 4 may comprise a number of data storage media, magazines or slots to hold the media, one or more drives to read from and write to the media, and a robotic mechanism for transporting the media into and out of the drives and slots. Software executing on library system 4 may control transporting media into and out of the drives, reading and writing to and from the media, and maintaining media tracking database 6 to track inventory of the media. More specifically, library system 4 may execute tape management software and library management software. Tape management software may be designed to track the media, i.e., logs and tracks the media in real-time in addition to performing restores. Library management software may provide an interface between an operating system and the robotic mechanism to automate media management and may also enable multiple users and systems to share library system 4.

Data storage media, particularly tape cartridges, that store data which is unlikely to be accessed often or ever again are typically stored or archived in off-site storage facilities 8. Off-site storage facilities 8 generally provide security and integrity since media can be securely stored in conditions that promote tape longevity. Off-site storage software executing on off-site storage facilities 8 tracks data storage media stored in off-site storage facilities 8. For example, when a data storage medium is moved from one of off-site storage facilities 8 to library system 4, off-site storage software updates media tracking database 6 to indicate its physical location to be library system 4. In a similar fashion, when a data storage medium is removed from library system 4 to be stored in one of off-site storage facilities 8, off-site storage software updates media tracking database 6 to indicate the physical location of the medium as off-site storage facilities 8.

The preceding description provides an overview of the operation of physical inventory system 2 for storing and transferring data to and from a set of data storage media and maintaining media tracking database 6 to track physical inventory of the media. However, the details for providing cradle-to-grave traceability of the set of data storage media within physical inventory system 2 have not been described. Accordingly, the following description provides details for cradle-to-grave traceability of a set of data storage media within physical inventory system 2, i.e., tracking physical inventory of the set of data storage media from receiving the set of data storage media from the media supplier, to loading the set of data storage media into library system 4 for reading and writing data to and from the media, to archiving the set of data storage media in off-site storage facilities 8, and including any steps back to a previous step.

Typically, the end user receives a set of data storage media with only VolSer numbers from the media supplier. Thus, when the set of data storage media are loaded into a library system, each of the data storage media are identified with the corresponding VolSer number for tracking physical inventory. The VolSer number is assigned to each data storage media by the media supplier or a distributor during a label and initialization (L&I) service. In particular, an L&I label containing a barcoded VolSer number is applied to the housing of the media during the L&I process. Consequently, the VolSer number is unique to a library system and, thus, is commonly used as the primary key for tracking physical inventory of the set of data storage media within the library system.

However, the VolSer number may only be unique within the library system, i.e., the VolSer number may not be unique within an off-site storage facility. For example, a data storage medium with a VolSer number may be transferred from a library system to an off-site storage facility. The data storage medium may then be transferred to a different off-site storage facility at a later time. Some organizations may archive data storage media at 200 different off-site storage facilities. In any case, the second data storage facility to which the data storage medium is transferred may already store a different data storage medium with the same L&I label and, thus, VolSer number.

In contrast, in the illustrated embodiment of FIG. 1, the media supplier provides the end user with the set of data storage media and media tracking database 6. The end user may receive media tracking database 6 electronically, e.g., via file transfer protocol (FTP), or on storage media such as a CD, DVD, flash memory stick, or other data storage media. Unlike the previously described system in which the end user is supplied with the set of data storage media with only VolSer numbers, the media supplier supplies physical inventory system 2 with the set of data storage media and media tracking database 6, which is generated from the manufacturer database and, thus, is populated with information for each of the data storage media prior to loading the media into library system 4.

A media supplier utilizes a proprietary manufacturer database to track data storage media from fabrication to delivery to the end user. In particular, each data storage medium manufactured by a media supplier has a unique identifier or marker that is used to track data storage media and is associated with a unique identification number. The unique identifier may be a 9940 linear barcode on the housing of the data storage media, a 2D snowflake barcode on the housing, a radio frequency identification (RFID) tag on or within the housing, or other unique identifier that can be read by the media supplier. Accordingly, the media supplier uses the unique identification number as the primary key for tracking data storage media within the manufacturer database.

The manufacturer database includes a plurality of fields each of which stores different information for tracking data storage media. For example, the manufacturer database includes fields that store the unique identification number, manufacturing date, VolSer number, purchase order information, current step in the fabrication process and time the medium went through the step, and other manufacturing information for each data storage medium. In addition, the unique identification number is relationally linked to the VolSer number and purchase order information thereby allowing the media supplier complete traceability of data storage media from fabrication to delivery to the end user.

Media tracking database 6 is generated from the manufacturer database by the media supplier. Consequently, media tracking database 6 includes a subset of the fields that form the manufacturer database. In particular, the subset of fields may be populated with the unique identification number, VolSer number, and purchase order information for each of the data storage media. Since the media supplier assigns each data storage medium a unique identification number to uniquely identify each medium from all other media manufactured, media tracking database 6 can use the unique identification number as the primary key for tracking media within physical inventory system 2. By providing media tracking database 6 to the end user with the set of data storage media, the end user may not have to scan the data storage media or populate a database with initial information when the media are loaded into library system 4, i.e., the media are pre-scanned by the media supplier. Moreover, media tracking database 6 can be directly loaded into or relationally linked to library system 4 and off-site storage facilities 8. More specifically, media tracking database 6 can be directly loaded into tape management software, library management software, and off-site storage software thereby providing complete cradle-to-grave traceability of the set of data storage media within physical inventory system 2.

Media tracking database 6 may also include additional fields for tracking physical inventory of the data storage media, such as the last four drive mounts, amount of stored information, performance data, and usage data. These fields are not populated by the media supplier. Rather, these fields are populated and maintained or updated by library system 4 and off-site storage facilities 8 each time the data storage media are, for example, transported into and out of drives, data is written to or read from the media, and media are transferred from library system 4 to one of off-site storage facilities 8.

For complete cradle-to-grave traceability of the data storage media, the end user maintains media tracking database 6 to track physical inventory of the data storage media. More specifically, tape management software and library management software executing on library system 4 may update fields of media tracking database 6 in real-time when media are transported into and out of drives, data is read from and written to the media, and when media is transferred from library system 4 to one of off-site storage facilities 8. Accordingly, media tracking database 6 may also include additional fields such as the last four drive mounts, recent performance data, amount of stored information, location, and for usage or physical inventory information. These fields are not populated by the media supplier. Rather, these fields are populated and updated when data storage media are scanned by library management system 4 and off-site storage facilities 8.

Furthermore, unlike a conventional system that maintains a database for tracking physical inventory of data storage media by scanning or reading the L&I label containing the barcoded VolSer number, each data storage media includes an international organization for standardization (ISO) 18000 or electronic product code (EPC) readable RFID tag that stores the manufacturer assigned unique identification number and physical inventory data, such as the VolSer number, purchase order information, performance data, usage data, and GPS data.

Some conventional systems track physical inventory of data storage media by scanning the L&I barcoded label for each data storage media and tracks usage information by communicating with a non-contact memory chip, such as an electronically erasable programmable read only memory (EEPROM) chip, on or within the housing of the media. The EEPROM chip may use a radio frequency interface to communicate with a drive. Consequently, a conventional system utilizes two different technologies to track physical inventory and usage data for data storage media.

In contrast, each data storage media in physical inventory system 2 includes an ISO 18000 or EPC readable RFID tag on or within the housing that stores a unique identification number and other physical inventory information, such as a VolSer number, purchase order information, and global positioning system (GPS) data, as well as usage data. More specifically, the RFID tag may use the ISO 18000 standard as an air interface protocol to communicate with the drive of library system 4 or a scanning system of offsite storage facilities 8. Thus, the RFID tag can store an EPC and provide functionality desired by library system 4, such as an AutoID Center, and off-site storage facilities 8. As an example, a media supplier or a distributor may apply the ISO 18000 or EPC readable RFID tag on or within the housing of the media. In another example, the ISO 18000 or EPC readable RFID tag may be integrated with an L&I barcode label on the housing. In any case, library system 4 and off-site storage facilities 8 can utilize ISO 18000 and EPC standardized scanning and inventory software for tracking physical inventory of the data storage media. As a result, five or more data storage media may be scanned or monitored within an expanded field thereby providing more efficient tracking of the data storage media.

Figure 2:
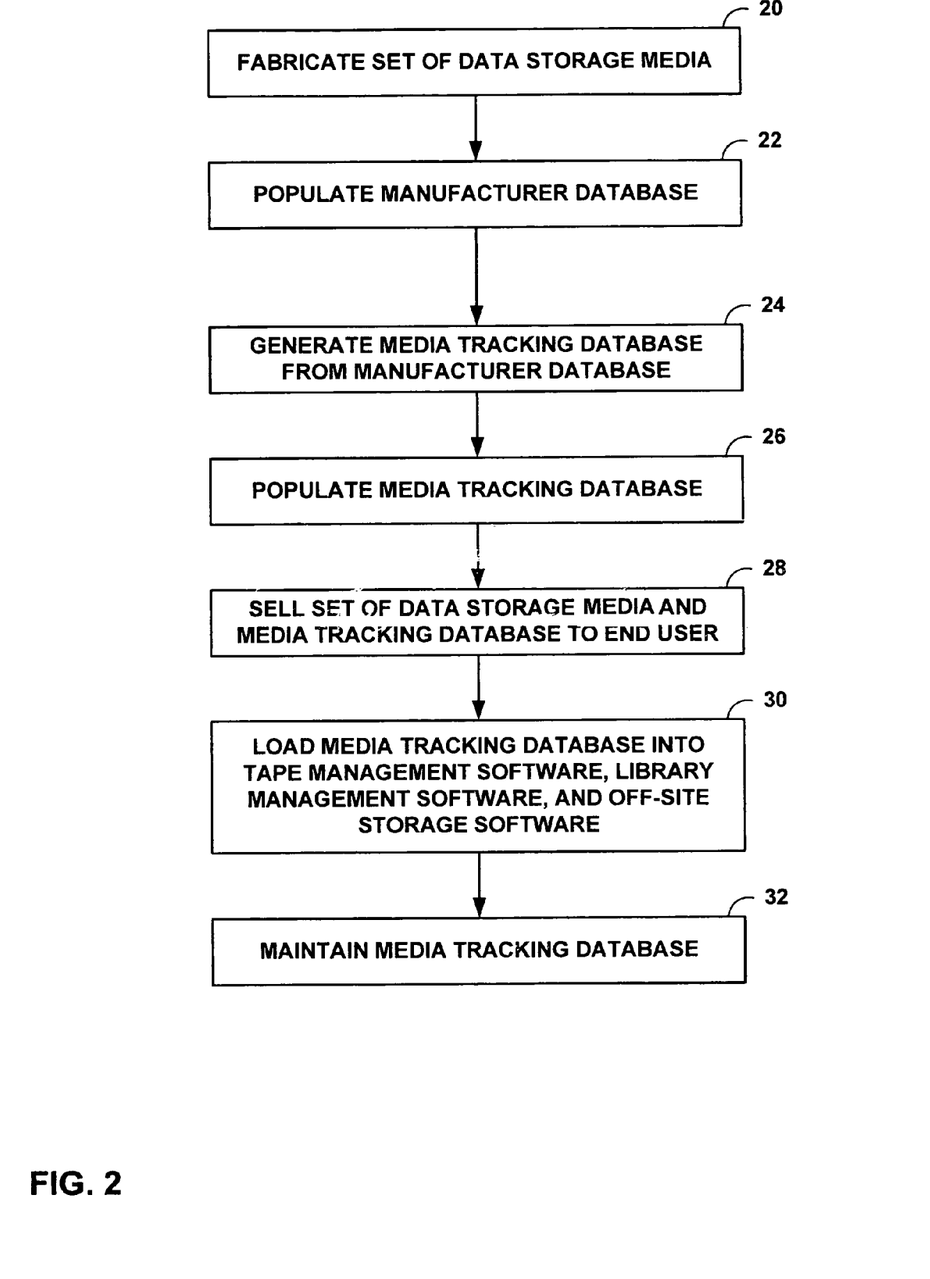
FIG. 2 is a flowchart illustrating a business technique for supplying end users with a set of data storage media and media tracking database for tracking physical inventory of set of data storage media.

FIG. 2 is a flowchart illustrating a technique for supplying end users with a set of data storage media and media tracking database 6. In accordance with the described operation of physical inventory system 2, physical inventory system 2 provides complete cradle-to-grave traceability of a set of data storage media more efficiently than conventional systems.

Initially, a media supplier fabricates a set of data storage media 20 and populates a manufacturer database 22 with a unique identification number, VolSer number, purchase order information, manufacturing date, and other manufacturing information for each data storage medium. In particular, the media supplier typically applies a unique identifier, such as a 9940 linear bar code, a 2D snowflake barcode, an RFID tag, or other unique identifier to or within the housing of each data storage media. The media supplier scans the unique identifier and uses the associated unique identification number as the primary key for the manufacturer database. Accordingly, the media supplier can utilize the manufacturer database to track the set of data storage media from fabrication to delivery to the user.

Next, the media supplier generates media tracking database 6 from the manufacturer database 24 and populates media tracking database 6 with the unique identifier field from the manufacturer database 26. More specifically, since media tracking database 6 is generated from the manufacturer database which includes a plurality of fields storing information for tracking the set of data storage media within the media supplier, media tracking database 6 includes a subset of the fields that form the manufacturer database. In particular, the subset of fields included in media tracking database 6 are populated with the unique identification number, VolSer number, and purchase order information for each of the data storage media. In addition, the unique identification number is relationally linked to the VolSer number and purchase order information within media tracking database 6 since media tracking database 6 is generated from the manufacturer database. Thus, the media supplier populates media tracking database 6 with the unique identification number, VolSer number, and purchase order information for each of the data storage media prior to selling the set of data storage media and media tracking database 6 to the end user 28.

The end user may receive media tracking database 6 electronically, e.g., via FTP, or on data storage media such as a CD, DVD, flash memory, or other data storage media. The end user may then load media tracking database 6 into library system 4 and, more particularly, may be relationally linked to tape management software and library management software executing on library system 4. In addition, media tracking database 6 may also be loaded into off-site storage facilities 8 and, more particularly, relationally linked to off-site storage software executing on off-site storage facilities 8 (30). By providing media tracking database 6 to the end user with the set of data storage media, media tracking database 6 provides the user complete cradle-to-grave traceability of the data storage media. Furthermore, the end user may not have to scan the data storage media received from the supplier and, thus, may be more cost effective than conventional systems that require the media to be scanned in order to populate a database with initial tracking information.

For complete cradle-to-grave traceability of the data storage media, the end user maintains media tracking database 6 to track physical inventory of the data storage media 32. More specifically, tape management software and library management software executing on library system 4 may update fields of media tracking database 6 in real-time when media are transported into and out of drives, data is read from and written to the media, and when media is transferred from library system 4 to one of off-site storage facilities 8. Accordingly, media tracking database 6 may also include additional fields such as the last four drive mounts, recent performance data, amount of stored information, location, and for usage or physical inventory information. These fields are not populated by the media supplier. Rather, these fields are populated and updated when data storage media are scanned by library management system 4 and off-site storage facilities 8.

In addition, off-site storage software executing on off-site storage facilities 8 update media tracking database 6 when data storage media are transferred into and out of off-site storage facilities 8. Since media tracking database 6 is directly loaded into or relationally linked to tape management software, library management software, and off-site storage software, physical inventory system 2 provides complete traceability of data storage media without potential issues that may arise within a conventional system that use a VolSer number to identify data storage media.

Unlike a conventional system that maintains a database for tracking physical inventory of data storage media by scanning or reading the L&I label containing the barcoded VolSer number, library system 4 and off-site storage facilities 8 read the unique identifier provided by the media supplier. As an example, in an exemplary embodiment, each data storage media includes an ISO 18000 or EPC readable RFID tag that stores the manufacturer-assigned unique identification number and physical inventory data, such as the VolSer number, purchase order information, performance data, usage data, and GPS data. In this embodiment, library system 4 and off-site storage facilities 8 can utilize ISO 18000 and EPC standardized scanning and inventory software for tracking physical inventory of the data storage media. Consequently, five or more data storage media may be scanned or monitored within an expanded field thereby providing more efficient tracking of the data storage media.

Figure 3:
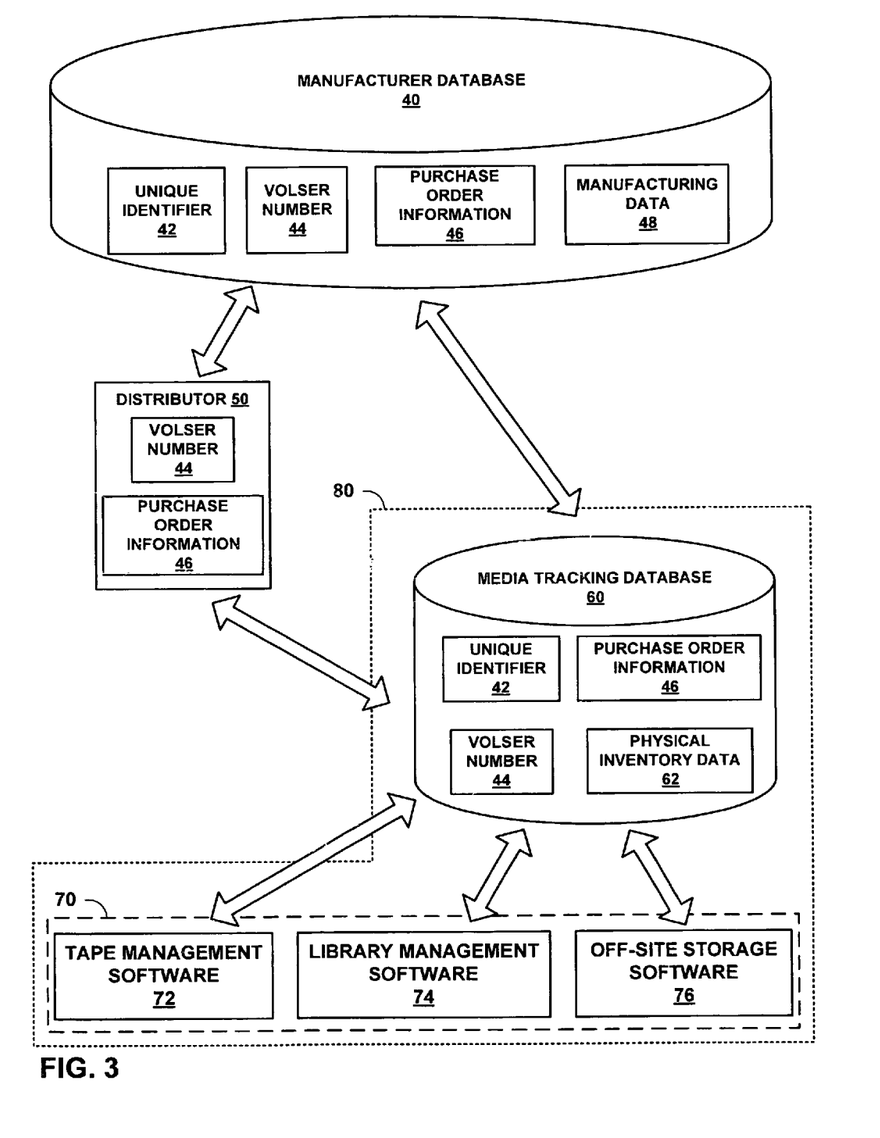
FIG. 3 is a diagram illustrating an example embodiment of a media tracking database that is generated from a proprietary manufacturer database and is relationally linked to software executing on a system that tracks physical inventory of a set of data storage media.

FIG. 3 is a diagram illustrating an example embodiment of a media tracking database 60 that is generated from a proprietary manufacturer database 40 and is relationally linked to software 70 executing on a physical inventory system. In general, media tracking database 60 provides a physical inventory system 80 for complete cradle-to-grave traceability of a set of data storage media.

The end-user operating physical inventory system 80 receives the set of data storage media from a media supplier with media tracking database 60. For example, the end user may receive media tracking database electronically, e.g., via FTP, or on storage media such as a CD, DVD, flash memory, or other data storage media. In particular, media tracking database 60 is generated from a proprietary manufacturer database 40 that stores a unique identification number 42, VolSer number 44, purchase order information 46, and other manufacturing data 48. Thus, media tracking database 60 is also populated with the unique identification number 42, VolSer number 44, and purchase order information 46 for each of the data storage media when the end user receives media tracking database 60, i.e., prior to loading the set of data storage media into physical inventory system 80.

More specifically, as shown in FIG. 3, a media supplier or a distributor 50 may apply an L&I label containing the barcoded VolSer number 44 to each of the data storage media. When distributor 50 applies the L&I label to each of the data storage media, the media supplier may provide the end user with media tracking database 60 populated only with the unique identification number 42. Accordingly, distributor 50 provides the VolSer number 44 and purchase order information 46 for each data storage media to the end user. Thus, in this case, the end user may be required to populate media tracking database 60 with VolSer number 44 and purchase order information 46. However, when the L&I label is applied by the media supplier, distributor 50 is not needed and the end user receives media tracking database 60 with the unique identification number 42, VolSer number 44, and purchase order information 46 from the media supplier.

In any case, media tracking database 60 can also store other physical inventory information 62, but does not store physical inventory information 62, such as the last four drive mounts, recent performance data, amount of stored information, location, and other physical inventory information until the set of data storage media are loaded into physical inventory system 80.

In particular, media tracking database 60 is loaded into or relationally linked to software executing on physical inventory system 80, i.e. tape management software 72, library management software 74, and off-site storage software 76. Tape management software 72 and library management software may execute on a library system of physical inventory system 80, such as library system 4 of FIG. 1. Off-site storage software 76 may execute on off-site storage facilities of physical inventory system 80, such as off-site storage facilities 8 of FIG. 1. In this manner, tape management software 72, library management software 74, and off-site storage software 76 can access and maintain media tracking database 60 to provide complete cradle-to-grave traceability of the set of data storage media. In addition, the unique identification number 42 can be used as the primary key for media tracking database 60. Thus, the end user can utilize media tracking database 60 to track physical inventory of the set of data storage without potential issues that may arise within a conventional system that uses a VolSer number to identify data storage media.

Furthermore, in some embodiments, the media supplier may supply the end user with data storage media that include an ISO 18000 or EPC readable RFID tag that stores the manufacturer assigned unique identification number, VolSer number, purchase order information, GPS data, and other physical inventory information. In this case, physical inventory system 80 can utilize ISO 18000 and EPC standardized scanning and inventory software for tracking physical inventory of the data storage media. Consequently, five or more data storage media may be scanned or monitored within an expanded field thereby providing more efficient tracking of the data storage media.

Figure 4:
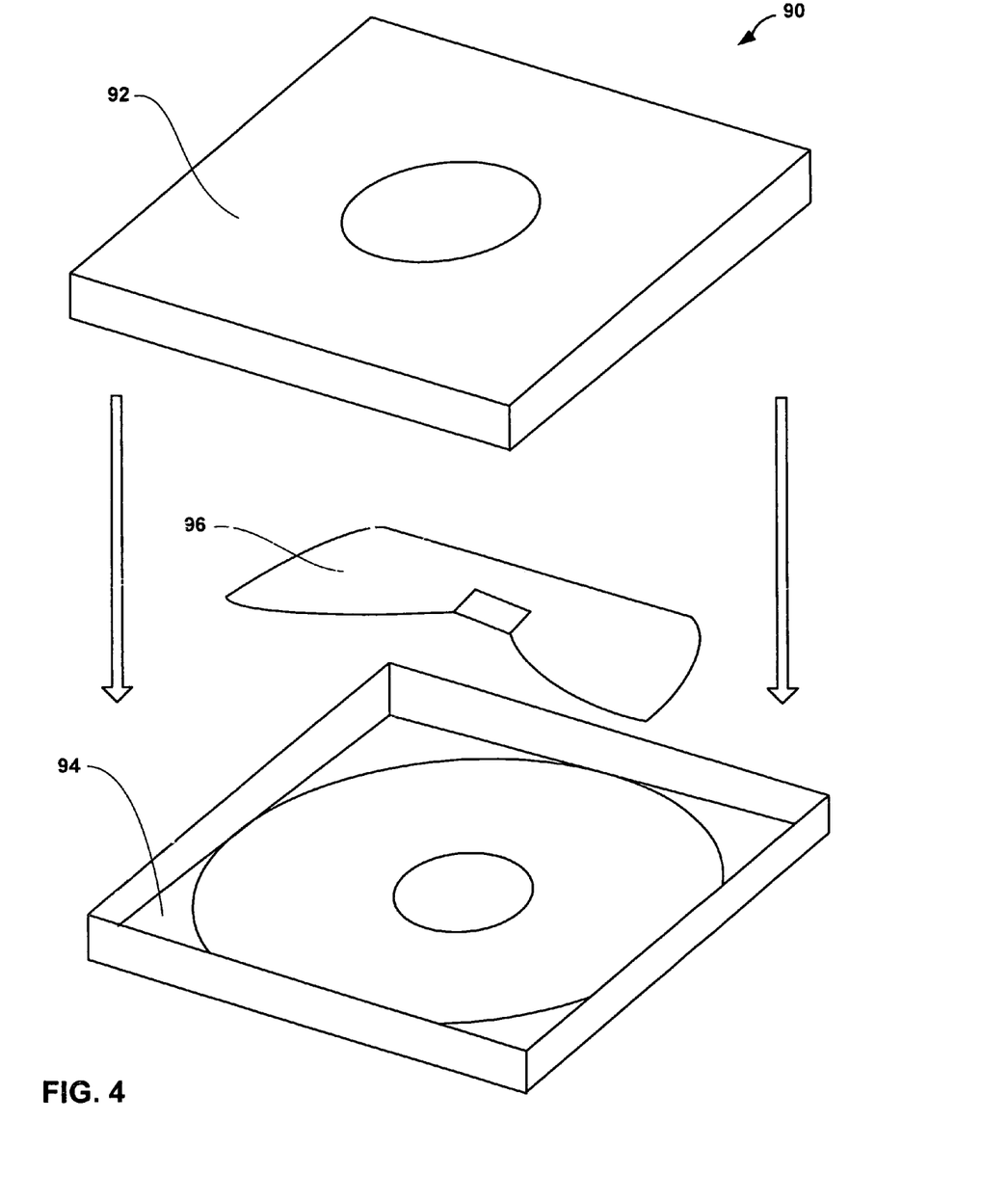
FIG. 4 is an exploded perspective view of a tape cartridge housing having a radio frequency identification (RFID) tag within the housing that stores a unique identification number used for tracking the physical location of the cartridge in accordance with an embodiment of the invention.
Figure 5:
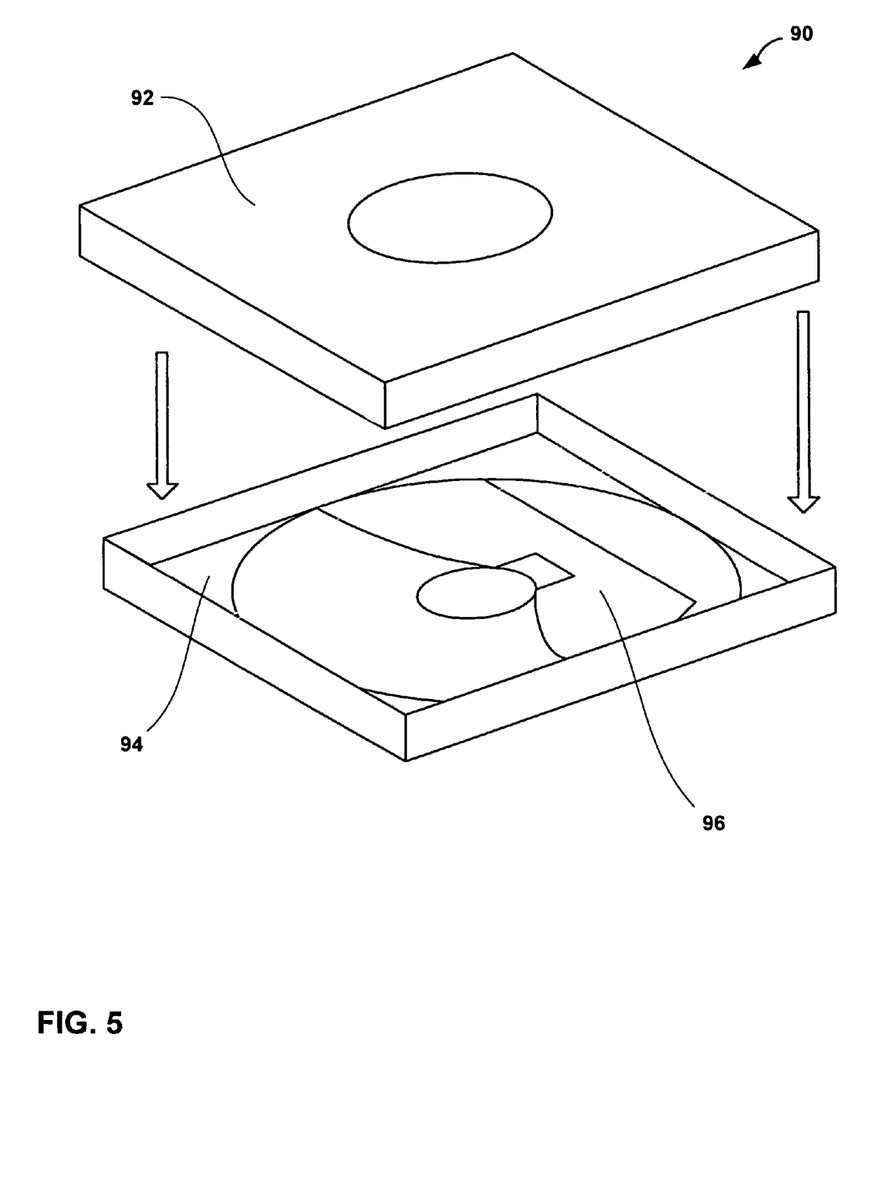
FIG. 5 is a perspective view of the tape cartridge of FIG. 4 with the RFID tag within the housing

FIG. 4 is an exploded perspective view of a tape cartridge housing 90 having an ISO 18000 or EPC readable RFID tag 96 within housing 90 that stores a unique identification number and other information used for tracking the physical location of cartridge 90 in accordance with an embodiment of the invention. FIG. 5 is a perspective view of tape cartridge housing 90 with RFID tag 96 affixed to an inner surface of the housing. Tape cartridge housing 90 may conform to a standard tape cartridge architecture, such as an LTO or Titanium architecture, and includes top 92 and bottom 94 structural units that mate with each other to fully enclose RFID tag 96 and magnetic tape (not shown) suitable for storing data. RFID tag 96 includes a microprocessor coupled to an antenna on a label. One side of the label may be coated with an adhesive for attaching RFID tag 96 to an inner surface of tape cartridge housing 90, as shown in FIG. 5.

In particular, RFID tag 96 stores the unique identification number assigned to tape cartridge housing 90 by the media supplier and other physical inventory information, such as the VolSer number, purchase order information, and GPS data, as well as performance data. Thus, a physical inventory system, such as physical inventory system 2 of FIG. 1, can use standard ISO 18000 and EPC standardized reading and inventory software for tracking tape cartridge 90 and monitoring the performance of cartridge 90. By storing physical inventory data and performance data in RFID tag 96, a library system and off-site storage facilities can utilize ISO 18000 and EPC standardized scanning and inventory software for tracking physical inventory and performance of the data storage media rather than utilizes two different technologies.

The physical inventory system for tape cartridges 90 may be less complex and more cost effective than conventional systems that scan the L&I barcode label for each data storage media to track physical inventory of data storage media and use a radio frequency interface to communicate with a non-contact EEPROM chip to retrieve performance data for the data storage media. In addition, data storage media having an ISO 18000 readable RFID tag storing a UPC may enable the physical inventory system to scan or read a number of cartridges, e.g., five of more cartridges, simultaneously. For example, a plurality of tape cartridges may be scanned at a dedicated platform within a library system, a transportation vehicle, or an off-site storage facility.

Figure 6A:
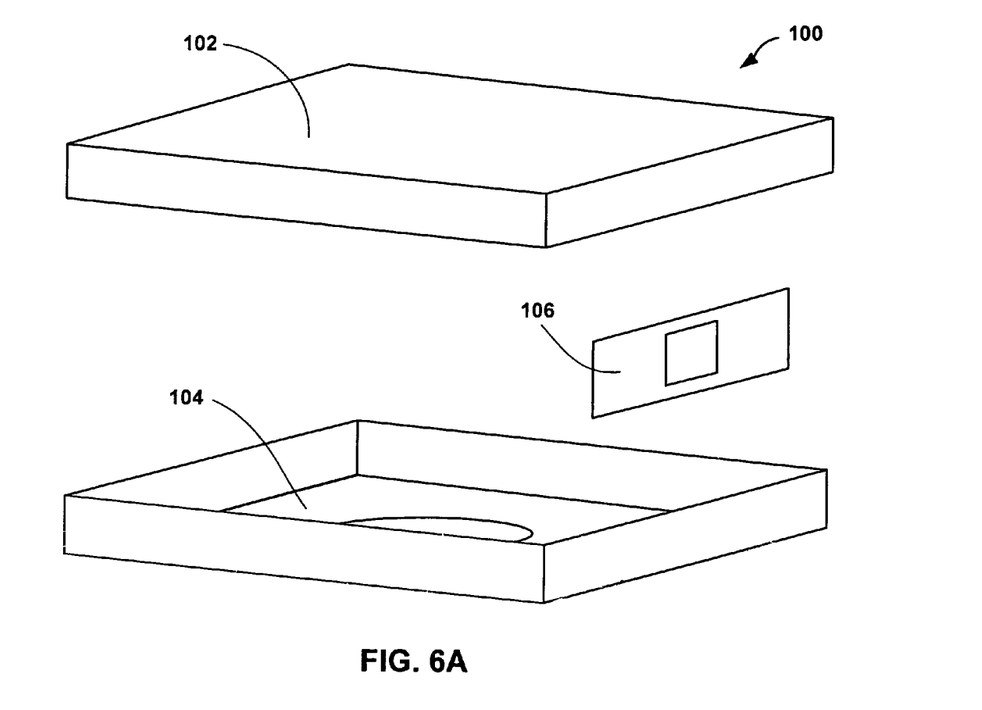
FIG. 6A is an exploded perspective view of a tape cartridge having an RFID tag on the housing that stores a unique identification number used for tracking the physical location of the cartridge in accordance with an embodiment of the invention.
Figure 6B:
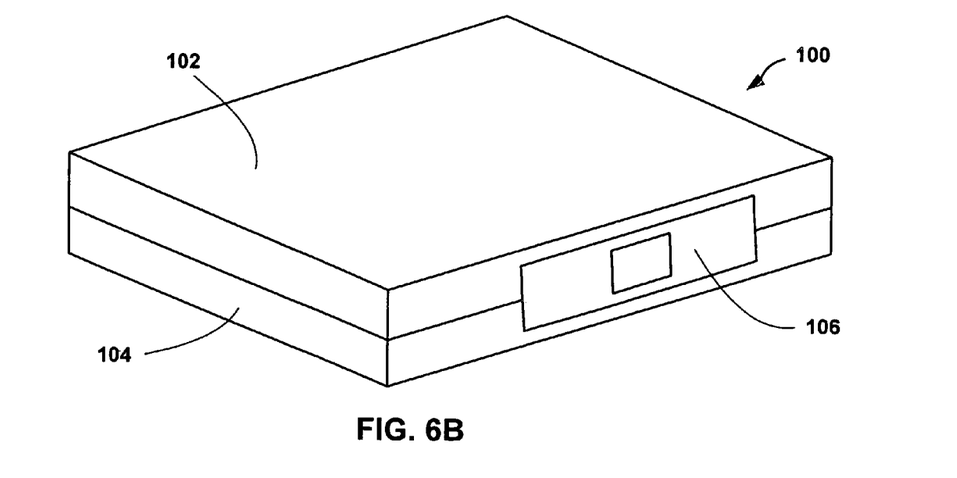
FIG. 6B is a perspective view of the tape cartridge of FIG. 6A.

FIG. 6A is an exploded perspective view of a tape cartridge housing 100 having an ISO 18000 or EPC readable RFID tag 106 on housing 100 that stores a unique identification number and other information used for tracking the physical location of cartridge 100 in accordance with an embodiment of the invention. FIG. 6B is a perspective view of tape cartridge 100 with RFID tag 106 on the housing.

Tape cartridge housing 100 may conform to a standard tape cartridge architecture, such as an LTO or Titanium architecture, and includes top 102 and bottom 104 structural units that mate with each other to fully enclose RFID tag 106 and magnetic tape (not shown) suitable for storing data. RFID tag 106 includes a microprocessor coupled to an antenna on a label. One side of the label may be coated with an adhesive for attaching RFID tag 106 to an inner surface of tape cartridge housing 90, as shown in FIG. 5.

RFID tag 106 is similar to RFID tag 96 of FIGS. 4 and 5 and, thus, stores the unique identification number assigned to tape cartridge housing 90 by the media supplier and other physical inventory information, such as the VolSer number, purchase order information, performance data, and GPS data. Consequently, standard ISO 18000 and EPC reading and inventory software can be used for tracking tape cartridge housing 100. Thus, a plurality of tape cartridges can be scanned simultaneously rather than individually scanning the L&I barcode label on each tape cartridge.

Various embodiments of the invention have been described. These and other embodiments are within the scope of the following claims.

The invention claimed is:

1. A method comprising:
   generating a non-proprietary media tracking database for tracking a set of data storage media;
   populating one or more fields of the non-proprietary media tracking database with manufacturer-assigned unique identification numbers for each of the data storage media, wherein the manufacturer-assigned unique identification numbers are unique for all media manufactured by a media supplier, and wherein the unique identification numbers for each of the data storage media are stored in readable radio frequency identification (RFID) tags affixed to or within housings of the data storage media, the RFID tags being selected from a group consisting of international organization for standardization (ISO) 18000 tags and AutoID Center electronic product code (EPC) tags;
   populating one or more fields of the non-proprietary media tracking database with VolSer numbers for each of the data storage media, wherein the VolSer numbers are not unique for all media manufactured by the media supplier;
   populating one or more fields of the non-proprietary media tracking database with purchase order numbers for each of the storage media;
   populating one or more fields of the non-proprietary media tracking database with manufacturing data for each of the data storage media;
   populating one or more fields of the non-proprietary media tracking database with one or more performance data, usage data, and physical inventory data;
   defining the manufacturer-assigned unique identification numbers as primary keys of the non-proprietary media tracking database for each of the data storage media such that the manufacturer-assigned unique identification numbers are relationally linked to the VolSer numbers, the purchase order numbers and the manufacturing data for each of the data storage media; and
   selling the set of data storage media with the non-proprietary media tracking database to an end user.

2. The method of claim 1, wherein the non-proprietary media tracking database is relationally linked to at least one of a customer tape management software, library management software, and off-site storage software.

3. The method of claim 1, wherein the non-proprietary media tracking database comprises a subset of fields of a proprietary manufacturer database that stores manufacturing information for the set of data storage media and wherein the non-proprietary media tracking database is relationally linked to the proprietary manufacturer database.

4. The method of claim 1, wherein generating and populating the non-proprietary media tracking database comprises generating and populating the non-proprietary media tracking database prior to selling the non-proprietary media tracking database and the set of data storage media.

5. The method of claim 1, further comprising maintaining the non-proprietary media tracking database to track physical inventory of the set of data storage media, wherein maintaining the media tracking database comprises:
   reading identification tags that store the unique identification numbers on each data storage media; and
   populating appropriate fields of the non-proprietary media tracking database with one or more of physical inventory data, performance data, and usage data.

6. A system for tracking physical inventory of a set of data storage media comprising:
   a set of data storage media wherein the data storage media include unique identifiers that store manufacturer-assigned unique identification numbers, wherein the manufacturer-assigned unique identification numbers are unique for all media manufactured by a media supplier, and wherein the unique identifiers comprise identifiers associated with readable radio frequency identification (RFID) tags affixed to or within housings of the data storage media, the RFID tags being selected from a group consisting of international organization for standardization (ISO) 18000 tags and an AutoID Center electronic product code (EPC) tags; and
   a non-proprietary media tracking database comprising a first field that includes manufacturer-assigned unique identification numbers, wherein the manufacturer-assigned unique identification numbers are unique for all media manufactured by a media supplier, wherein a second field of the non-proprietary media tracking database includes VolSer numbers for each of the data storage media, wherein the VolSer numbers are not unique for all media manufactured by the media supplier, wherein a third field of the non-proprietary media tracking database includes purchase order numbers for each of the data storage media, wherein a fourth field of the non-proprietary media tracking database includes manufacturing data for each of the data storage media, wherein one or more additional fields of the non-proprietary media tracking database include one or more of performance data, usage data, and physical inventory data, wherein the manufacturer-assigned unique identification numbers are defined as primary keys of the non-proprietary media tracking database for each of the data storage media such that the manufacturer-assigned unique identification numbers are relationally linked to the VolSer numbers, the purchase order numbers and the manufacturing data for each of the data storage media.

7. The system of claim 6, further comprising at least one of a customer tape management software, library management software, and off-site storage software that is relationally linked to the non-proprietary media tracking database.

8. The system of claim 6 wherein the non-proprietary media tracking database is relationally linked to a proprietary media tracking database, wherein the fields of the non-proprietary media tracking comprise a subset of fields of the proprietary media tracking database.

9. The system of claim 6, wherein the first field of the non-proprietary media tracking database is populated with the unique identification numbers prior to selling the set of data storage media to the end user with the non-proprietary media tracking database.

10. The system of claim 6, further comprising: means for reading the unique identifiers on each data storage media to identify the data storage media.

11. The system of claim 6, wherein the non-proprietary media tracking database provides cradle-to-grave traceability of the data storage media.

12. The system of claim 6, further comprising a physical inventory system that updates one or more fields of the non-proprietary media tracking database in real-time when the data storage media are transported into and out of drives, when data is read from and written to the data storage media, and when the data storage media is transferred to a storage facility.

13. The method of claim 1, wherein generating the non-proprietary media tracking database is performed by a computer system, populating the non-proprietary media tracking database is performed by the computer system, and defining the manufacturer-assigned unique identification numbers as the primary keys is performed by the computer system.

* * * * *

UNITED STATES PATENT AND TRADEMARK OFFICE
CERTIFICATE OF CORRECTION

| | |
|---|---|
| PATENT NO. | : 7,660,812 B2 |
| APPLICATION NO. | : 11/219044 |
| DATED | : February 9, 2010 |
| INVENTOR(S) | : Findlay et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 462 days.

Signed and Sealed this

Thirtieth Day of November, 2010

David J. Kappos
*Director of the United States Patent and Trademark Office*